US010283767B2

United States Patent
Moc et al.

(10) Patent No.: US 10,283,767 B2
(45) Date of Patent: May 7, 2019

(54) SILICON PARTICLES HAVING A CAVITY IN THE SHAPE OF A MICROORGANISM

(71) Applicant: Robert Bosch GmbH, Stuttgart (DE)

(72) Inventors: Andre Moc, Grossschoenau (DE); Imke Heeren, Stuttgart (DE); Ingo Kerkamm, Stuttgart-Rohr (DE); Pallavi Verma, Leinfelden (DE)

(73) Assignee: ROBERT BOSCH GMBH, Stuttgart (DE)

(*) Notice: Subject to any disclaimer, the term of this patent is extended or adjusted under 35 U.S.C. 154(b) by 205 days.

(21) Appl. No.: 15/314,442

(22) PCT Filed: May 4, 2015

(86) PCT No.: PCT/EP2015/059739
§ 371 (c)(1),
(2) Date: Nov. 28, 2016

(87) PCT Pub. No.: WO2015/180929
PCT Pub. Date: Dec. 3, 2015

(65) Prior Publication Data
US 2017/0194642 A1    Jul. 6, 2017

(30) Foreign Application Priority Data
May 27, 2014   (DE) .................. 10 2014 210 086

(51) Int. Cl.
*H01M 4/38* (2006.01)
*C01B 33/02* (2006.01)
(Continued)

(52) U.S. Cl.
CPC ............ *H01M 4/386* (2013.01); *C01B 33/02* (2013.01); *C01B 33/021* (2013.01);
(Continued)

(58) Field of Classification Search
CPC ............................ H01M 4/386; C01B 33/021
(Continued)

(56) References Cited

U.S. PATENT DOCUMENTS

2012/0196129 A1    8/2012  Okumura et al.
2014/0030599 A1*   1/2014  Lee ...................... H01M 4/625
                                                           429/231.8

FOREIGN PATENT DOCUMENTS

CN          1382627 A      12/2002
CN        101186310 A       5/2008
(Continued)

OTHER PUBLICATIONS

Callone et al. Immobilization of yeast and bacteria cells in alginate microbeads coated with silica membranes. J. Mater. Chem, vol. 18, 2008, pp. 4839-4848 [online], [retrieved on Jul. 23, 2018]. Retrieved from the internet <URL: http://pubs.rsc.org/en/content/articlepdf/2008/jm/b807301e> (Year: 2008).*
(Continued)

*Primary Examiner* — James M Erwin
(74) *Attorney, Agent, or Firm* — Norton Rose Fulbright US LLP; Gerard Messina

(57) ABSTRACT

A method is described for producing silicon particles, in particular for an anode material of a lithium cell. In order to improve the cycle stability of lithium cells and to minimize losses in capacitance, in particular, microorganisms are dispersed in at least one solvent in a method step a), the solvent including at least one silicon compound. In a method step b), the at least one solvent is then removed, and a residue remains. In method step c), the residue is then heated under a reducing atmosphere. In addition, the invention relates to corresponding silicon particles, and to a corresponding anode material including silicon particles, and to a lithium cell provided with such.

12 Claims, 4 Drawing Sheets

(51) Int. Cl.
 *C01B 33/027* (2006.01)
 *H01M 4/134* (2010.01)
 *C01B 33/021* (2006.01)
 *H01M 10/052* (2010.01)
 *H01M 4/02* (2006.01)

(52) U.S. Cl.
 CPC .......... *C01B 33/027* (2013.01); *H01M 4/134* (2013.01); *H01M 10/052* (2013.01); *C01P 2004/30* (2013.01); *C01P 2004/34* (2013.01); *H01M 2004/021* (2013.01)

(58) Field of Classification Search
 USPC ....................................................... 429/218.1
 See application file for complete search history.

(56) References Cited

FOREIGN PATENT DOCUMENTS

| EP | 1604415 | A1 | 12/2005 |
| EP | 2104175 | A1 | 9/2009 |
| GB | 831359 | A | 3/1960 |
| JP | 2006326557 | A | 12/2006 |
| KR | 20130141206 | A | 12/2013 |
| WO | 2004086539 | A1 | 10/2004 |

OTHER PUBLICATIONS

International Search Report for PCT/EP2015/059739, dated Aug. 7, 2015.
Xilin Chen et al: "Virus-Enabled Silicon Anode for Lithium-Ion Batteries", ACS NANO, Bd. 4 Nr. 9, Sep. 28, 2010 (Sep. 28, 2010), Seiten, 5366-5372, XP055204899.
Daniel Weinzierl et at: "Hollow SiO 2 Microspheres Produced by Coating Yeast Cells", Crystal Growth & Design, Bd. 9, Nr. 5, May 6, 009 (May 6, 2009), Seiten 2318-2323, XP055204623.
Ixilin Chen et al: "A Patterned 3D Silicon Anode Fabricated by Electrodeposition on a Virus-Structured Current Collector", Advanced Functinal Materials, Bd. 21, Nr. 2, Jan. 21, 2011, (Jan. 21, 2011), Seiten 380-387, XP055097647.
O. P. Chakrabarti et al, "Si-Sic ceramics from plant precursor", Journal of Materials Science, Bd. 39, Nr. 14, Jul. 1, 2004 (Jul. 2004—P1), Seiten 4715-4717, XP055204855.

\* cited by examiner a)

b)

c)

SILICON PARTICLES HAVING A CAVITY IN THE SHAPE OF A MICROORGANISM

FIELD OF THE INVENTION

The present invention relates to a method for producing silicon particles, to silicon particles, an anode material for a lithium cell as well as to a corresponding lithium cell.

BACKGROUND INFORMATION

Conventional lithium-ion batteries for automotive applications and consumer applications use graphite as an intercalation material for lithium on the anode side.

However, graphite has a theoretical specific capacitance of only approximately 330 mAh/g. Silicon, on the other hand, has a theoretical specific capacitance of more than 3000 mAh/g and is thus is one of the most promising intercalation materials for the substitution of graphite in lithium-ion batteries.

During the electrochemical cyclization, however, the volume of silicon changes by more than 300%. This may in turn lead to the formation of tears in silicon particles. The creation of tears may then entail a loss in capacitance, which, for instance, may be based on a continuous SEI creation (solid electrolyte interface).

Zhang et al. (Microporous and Mesoporous Materials, 100, 2007, p. 322-327) describes the hydrothermal synthesis of hollow zinc-oxide spheres while using spherobacterium as bio-template.

SUMMARY

The subject matter of the present invention is a method for producing silicon particles, in particular for an anode material of a lithium cell such as a lithium-ion cell.

The method includes method step a), in which microorganisms are dispersed in at least one solvent that includes at least one silicon compound such as a silicon precursor.

The method furthermore includes method step b), in which the at least one solvent is removed, while a residue remains.

In a method step c), the residue is then heated under a reducing atmosphere.

Because of the dispersing of the microorganisms in the at least one solvent in method step a) and the removal of the at least one solvent in method step b), the at least one silicon compound is able to deposit on the surface of the microorganisms and in particular form a coat on the microorganisms. Heating under a reducing atmosphere in method step c) then makes it possible to convert the at least one silicon compound into metallic or elemental silicon, and in particular, to reduce it to metallic or elemental silicon.

In addition, the heating under a reducing atmosphere in method step c) also allows the at least partial or, in particular, the essentially complete removal of the microorganisms. Especially carbon and/or phosphorus and/or nitrogen and/or oxygen and/or hydrogen and/or sulphur of the microorganisms can be removed at least partially or, in particular, essentially completely in method step c). Carbon and/or phosphorus and/or nitrogen of the microorganisms are/is able to be removed in method step c) in a reductive manner, for instance, such as at least partially or, in particular, essentially completely.

For example, in method step c), the carbon of the microorganisms is able to be reduced to gaseous methane ($CH_4$) and/or to elemental carbon.

In the individual case, the carbon of the microorganisms may be removed only partially in method step c) and partially remain in the form of elemental carbon, which forms a carbon-silicon composite together with the silicon formed from the at least one silicon compound. However, since a carbon-silicon composite forms at the inner surface of the silicon particles to be created, where the carbon is barely able to contribute to an increase in the electrical conductivity of the silicon particles but reduces the specific energy density, the carbon of the microorganisms is removed, in particularly essentially completely in method step c) within the scope of one preferred specific embodiment. For example, in method step c), the carbon of the microorganisms may be reduced to gaseous methane ($CH_4$) and removed as such.

In method step c), the phosphorus of the microorganisms is able to be reduced to gaseous $P_4$ tetrahedrons and/or $P_2$ molecules, for instance, and removed as such. The nitrogen of the microorganisms may be reduced to elemental nitrogen ($N_2$) and/or ammonia ($NH_3$), for example, in method step c) and removed as such. Hydrogen and/or oxygen and/or sulphur of the microorganisms can be removed in method step c), for instance in the form of hydrogen ($H_2$) and/or water ($H_2O$) and/or hydrogen sulphide ($H_2S$). Since microorganisms are essentially made from the elements carbon, phosphorus, nitrogen, oxygen, hydrogen and sulphur, the microorganisms are thus advantageously able to be removed essentially completely in method step c). Instead of the microorganism, a cavity then remains, which is enclosed by a silicon shell produced in particular by the conversion or the reduction of the at least one silicon compound.

The microorganisms such as bacteria are used especially as morphological, so-called template (pattern, matrix) or bio-template for producing silicon particles having a desired cavity structure, for instance in the form of a spherical or aspherical_hollow shell, e.g., featuring an elongated, hollow-sphere-type or spiral-type such as a helical form of silicon or a silicon alloy or a silicon-carbon composite, as the case may be.

Especially hollow silicon particles, (each) having a silicon shell that encloses a cavity, are thereby advantageously able to be created. The silicon shell may in essence enclose the cavity completely, in particular. The shape of the cavity enclosed by the silicon shell in particular corresponds essentially to the shape of the microorganisms used in method step a).

A silicon particle, in particular, describes a particle which includes metallic or elemental silicon.

In particular, a silicon shell may mean a shell whose material includes metallic or elemental silicon. The material of a silicon shell may be developed from metallic or elemental silicon or a silicon alloy, in particular. Developed specifically means that the material may include up to 10 wt-% of other elements and/or compounds in relation to the total weight of the material.

The hollow silicon particles produced by the method may be used to special advantage as anode material for lithium cells, for instance for a silicon anode or a silicon-carbon composite anode, such as of lithium-ion cells or lithium-ion batteries, since the cavities created by the microorganisms allow for the compensation of the high volume change of the silicon during the electrochemical cyclization, thus making it possible to provide silicon structures that are able to tolerate mechanical stress, in particular during the electrochemical cyclization. This in turn may make it possible to minimize capacitance losses caused by an SEI formation, such as capacitance losses that accompany a continual SEI formation, and to increase the cycle stability and the efficiency of lithium cells equipped therewith in an advantageous manner. Due to the fact that the silicon shell in essence can enclose the cavity completely, the SEI formation is advantageously able to be minimized and may possibly even be restricted to the surface of the silicon shell.

In addition, the method is advantageously able to be carried out in a cost-effective, rapid and environmentally friendly manner.

In method step c), the residue may be heated, in particular to a temperature at which the at least one silicon compound is converted into metallic or elemental silicon, in particular, especially under the reducing atmosphere, and the microorganisms or the carbon and/or the phosphorus and/or the nitrogen and/or the oxygen and/or the hydrogen and/or the sulphur of the microorganisms are/is at least partially removed or, in particular, removed essentially completely.

In method step c), the residue may be heated to a temperature in a range from >400° C. to <1410° C., in particular. A temperature of more than 400° C. in method step c) advantageously makes it possible both to convert the at least one silicon compound into silicon and to remove the microorganisms. Since the temperature in method step c) lies below 1410° C., it is can advantageously be avoided that the produced silicon particles are destroyed by the melting of the silicon.

Within the scope of one specific embodiment, the reducing atmosphere in method step c) has an oxygen partial pressure ($pO_2$) of less than $1 \cdot 10^{-24}$ bar. The reducing atmosphere in method step c) in particular may have an oxygen partial pressure ($pO_2$) of less than $1 \cdot 10^{-25}$ bar. Because of a low oxygen partial pressure ($pO_2$), the temperature required for the reduction of carbon in method step c) is advantageously able to be lowered and/or a creation of silicon oxide having poor electrical conductivity, such as silicon dioxide ($SiO_2$), is able to be reduced.

The reducing atmosphere in method step c) may contain hydrogen, in particular.

Within the scope of another specific embodiment, the reducing atmosphere in method step c) includes hydrogen and at least one protective gas. By using a protective gas-gas mixture, the safety of the method is advantageously able to be increased. In addition, the use of a protective gas-gas mixture makes it possible to reduce a silicon loss through the creation of monosilane ($SiH_4$) and to increase the effectiveness of the method in this manner.

For example, the at least one protective gas may include at least one noble gas such as argon, and/or nitrogen.

Nitrogen is advantageously especially cost-effective and therefore makes it possible to use a forming gas, for instance, in method step c). When using a forming gas of 95 vol.-% nitrogen and 5 vol.-% at 500° C., however, silicon nitride ($Si_3N_4$) is able to form, which may have poor electrical conductivity.

Within the scope of one development of this specific embodiment, the at least one protective gas is a noble gas or a noble-gas mixture. The at least one protective gas may contain argon, or be argon, in particular. Because of the use of a noble gas such as argon as protective gas, it is advantageously possible to reduce or prevent the formation of undesired silicon compounds, such as monosilane ($SiH_4$) and/or silicon nitride ($Si_3N_4$) and to thereby improve the specific energy density and the electrical conductivity of the silicon particles.

Within the scope of a special further development of this specific embodiment, the reducing atmosphere in method step c) includes $\geq 1$ vol.-% to $\leq 10$ vol.-% of hydrogen and $\geq 90$ vol.-% to $\leq$vol.-% of the at least one protective gas such as argon and/or nitrogen, especially argon, in particular in relation to the total gas volume. This has shown to be particularly advantageous for the safety of the method. For instance, the reducing atmosphere in method step c) may include $\geq 5$ vol.-% of hydrogen and 95 vol.-% of the at least one protective gas such as argon and/or nitrogen, in particular argon.

For example, in method step c), the residue may be heated to a temperature in a range from >400° C. or $\geq 450$° C. or $\geq 500$° C. or $\geq 550$° C. or $\geq 600$° C. to $\geq 1400$° C.

At temperatures of $\geq 1400$° C., the carbon of the microorganisms is able to react with silicon to silicon carbide (SiC). Silicon carbide may have a higher electrical conductivity than elemental silicon, but since it forms especially on the inner surface of the silicon particles, it barely affects the electrical conductivity of the silicon particles among each other, but lowers their specific energy density. In order to avoid a creation of silicon carbide, the temperature in method step c) may therefore be <1400° C., in particular.

Within the scope of a further specific embodiment, the residue is (initially) heated to a temperature in a range from >400° C. to $\leq 1000$° C. in method step c). This has shown to be advantageous for converting the at least one silicon compound into silicon, and for removing the microorganisms at least partially, or in particular, essentially completely. For instance, the residue in method step c) may (initially) be heated to a temperature in a range from $\geq 450$° C. or $\geq 500$° C. or $\geq 550$° C. or $\geq 600$° C. to $\leq 1000$° C., for example to approximately 800° C. A temperature treatment under a reducing atmosphere at a temperature of $\leq 1100$° C., for instance at $\leq 1000$° C., has shown to be especially advantageous for the reductive removal of the carbon of the microorganisms.

Since silicon oxide (SiO) is lithiatable, a small amount of silicon oxide, such as $\leq 10$ wt.-%, in particular $\leq 5$ wt.-%, in relation to the total weight of the silicon particles, especially of the silicon shell of the silicon particles, is able to be tolerated. However, in order to achieve the highest possible specific energy density and electrical conductivity, it is advantageous if the silicon particles, in particular the silicon shell of the silicon particles, are/is (essentially) free from silicon oxide. For the removal of possibly occurring oxidic impurities such as silicon oxide, heating under a reducing atmosphere to a temperature of >1000° C., such as approximately 1100° C., has shown to be advantageous.

Within the scope of a special refinement of this specific embodiment, the residue in method step c) thus is then (i.e. following the heating to a temperature of $\leq 1000$° C.) heated to a temperature in a range from >1000° C. to $\leq 1200$° C., e.g., to approximately 1100° C. In this temperature range, silicon oxide can advantageously be reduced to metallic or elemental silicon under a reducing atmosphere. This in turn makes it possible to further improve the specific energy density and electrical conductivity of the silicon particles in an advantageous manner.

Within the scope of another specific embodiment, the microorganisms are bacteria.

For instance, the microorganisms may be bacteria that are selected from the group of rod-shaped bacteria such as bacilli, of coccobacteria such as cocci, and/or of bacteria of other bacteria forms.

Bacteria of other bacteria forms, for instance, can be threadlike bacteria, e.g., enlarged rod-shaped bacteria, bacteria having a curved rod shape, comma-shaped bacteria, club-shaped bacteria, helical bacteria, filamentous bacteria, spiral-shaped bacteria, especially screw-shaped bacteria, budding bacteria, in particular bacteria including stalk and/or appendage such as trichome-forming bacteria and/or hyphae-forming bacteria, and/or bacterial structures having a plurality of cells.

Rod-shaped bacteria, for instance, can be bacilli and/or *Escherichia* such as *bacillus*, coccobacillus, diplobacillus, palisades, *streptobacillus* and/or *lactobacilli*.

Coccabacteria, for instance, can be cocci, in particular (mono)cocci such as micrococcus, diplococci, encapsulated diplococci such as *pneumococcus, staphylococci, streptococci*, sarcines and/or tetrads.

Thread-shaped bacteria or enlarged rod bacteria may be fusobacteria, for instance.

Bacteria having a curved rod shape, for example, may be vibrio.

Comma-shaped bacteria can be *bdellovibrios*, for instance.

Club-shaped bacteria, for example, can be *corynebacteriaceae*.

Helical bacteria may be *helicobacter pylori*, for instance.

Spiral-shaped bacteria, especially screw-type bacteria such as corkscrew-shaped bacteria, for instance, can be *spirochaeta* and/or *borrelia*, e.g., *borrelia burgdorferi*, and/or *spirilla*.

Budding bacteria, for instance, may be bacteria having a stalk, e.g., *caulobacter*, and/or bacteria having an appendage, for instance hypha such as *hyphomicrobium*.

Trichome-forming bacteria, for instance, may be caryophanon and/or *oscillatoria*.

Hyphae-forming bacteria may be *streptomyces*, for example.

Bacterial structures having a plurality of cells, for instance, can be diplobacillus, palisades and/or streptobacilli such as *streptobacillus, lactobacilli*, pleurocapsa, merismopedia, diplococci, encapsulated diplococci, such as *pneumococcus, staphylococci, streptococci*, sarcines, tetrads and/or bacteria with rod strings sheathed in tubes, e.g., *leptothrix*.

Within the scope of one development, the microorganisms in method step a) are bacteria which are selected from the group of rod-shaped bacteria, coccobacteria, thread-like bacteria, especially the enlarged rod-shaped bacteria, of bacteria having a curved rod shape, comma-shaped bacteria, club-shaped bacteria, helical bacteria, filamentous bacteria, spiral-shaped bacteria, especially the screw-shaped bacteria, of budding bacteria, in particular the bacteria having a stalk and/or appendage, such as hyphae-forming bacteria, and/or the bacterial structures having a plurality of cells.

For example, the microorganisms may be bacteria selected from the group of bacilli, e.g., *bacillus*, coccobacillus, diplobacillus, palisades, *streptobacillus* and/or *lactobacilli*, and/or cocci, e.g., (mono)cocci, e.g., *micrococcus*, diplococci, encapsulated diplococci, e.g., *pneumococcus, staphylococci, streptococci*, sarcines and tetrads, and/or budding bacteria having hypha and/or stalk, and/or the thread-like bacteria, for instance enlarged rods such as fusobacteria, bacteria having a curved rod shape such as vibrio, comma-shaped bacteria such as *bdellovibrio*, of club-shaped bacteria such as *corynebacteriaceae*, helical bacteria such as *helicobacter pylori*, filamentous bacteria and/or screw-shaped bacteria, e.g., the corkscrew-shaped bacteria such as *borrelia*, e.g., *borrelia burgdorferia*, and/or of the *spirochaeta*.

Particularly suitable for use in the production of an anode material on account of their shape are aspherical bacteria such as rod bacteria, thread-like bacteria, particularly enlarged rod bacteria, bacteria having a curved rod shape, comma-shaped bacteria, club-shaped bacteria, helical bacteria, filamentous bacteria, spiral-shaped bacteria, in particular the screw-shaped bacteria, budding bacteria, especially the bacteria having stalk and/or appendage, e.g., of the hyphae-forming bacteria, and/or bacterial structures having a plurality of cells. For example, the microorganisms may be rod bacteria, e.g., *bacilli*.

Within the scope of a further specific embodiment, dried microorganisms, in particular bacteria, are used in method step a). The microorganisms, in particular bacteria, may be dried under a high vacuum and/or freeze-dried. This advantageously ensures that the microorganisms, in particular bacteria, contain barely any water, or no water at all, if possible, that is to say, are anhydrous. In an advantageous manner, this in turn makes it possible to avoid oxidic impurities such as silicon oxide, and to improve the specific energy density and electrical conductivity of the silicon particles in this way, especially of the silicon shell of the silicon particles.

Within the scope of a further specific embodiment, the at least one solvent, in particular in method steps a) and b), is an organic solvent. Silicon compounds, such as silicon precursors, may exhibit excellent solubility in organic solvents. For example, the at least one solvent may be anhydrous and more specifically, be (essentially) free from oxygen. In this way, oxidic impurities such as silicon oxide are able to be avoided through the at least one solvent and the specific energy density and electrical conductivity of the silicon particles, in particular the silicon shell of the silicon particles, may be improved in this manner. The at least one solvent, for instance, may include, or be, an alkane such as hexane and/or heptane.

The at least one silicon compound in particular may be soluble in the at least one solvent. In method step a), it is therefore possible to use a solution of at least one solvent and at least one silicon compound, in particular.

For example, the at least one silicon compound can include, or be, substituted or unsubstituted silane and/or substituted or unsubstituted siloxane, for instance as silicon precursor.

A substituted silane or siloxane may be understood as monosubstituted, multisubstituted or completely substituted silane derivatives or siloxane derivatives, in particular. They may contain both hydrogen and also be free from hydrogen in the case of a complete substitution.

Within the scope of another specific embodiment, the at least one silicon compound is a substituted or an unsubstituted silane, in particular in method step a). In contrast to siloxanes, silanes have no oxygen bridges. More specifically, the at least one silicon compound may be a silane that is (essentially) free from oxygen. The use of silanes, especially of silanes that are (essentially) free from oxygen, advantageously makes it possible to avoid oxidic impurities such as silicon oxide, and to thereby improve the specific energy density and the electrical conductivity of the silicon particles, especially of the silicon shell of the silicon particles.

Within the scope of a special further development of this specific embodiment, the at least one silicon compound, in particular in method step a), includes or is:

an, in particular, substituted or unsubstituted silane of the general chemical formula: $SiCl_xH_{4-x}, 0 \leq x \leq 4$, and/or an alkylsilane and/or arylsilane, for instance of the general chemical formula: $SiR^1R^2R^3R^4$, $R^1$, $R^2$, $R^3$ and $R^4$ independently of each other substituting for hydrogen or chlorine or an alkyl group in each case, such as methyl or ethyl, or an aryl group, such as phenyl, and at least one of the substituents $R^1$, $R^2$, $R^3$ and $R^4$ substituting for an alkyl group, such as methyl or ethyl, or an aryl group, such as phenyl.

For example, the at least one silicon compound, in particular in method step a), may be an alkylsilane and/or an arylsilane of the general chemical formula: $SiR_4$, R substituting for an alkyl group, e.g., methyl and/or ethyl, or for an aryl group, such as phenyl.

Within the scope of a further specific embodiment, the dispersion, e.g., solution, in method step a) additionally includes at least one alloy metal compound. In this way, it is advantageously possible to form a silicon alloy, especially in method step c). In particular, a silicon shell is able to be formed from a silicon alloy in the process. Silicon alloys may advantageously feature a lower volume change than metallic silicon. The at least one alloy metal compound in particular may include at least one alloy metal, which is selected from the group made up of iron (Fe), tin (Sn), antimony (Sb), titanium (Ti), copper (Cu), aluminum (Al), nickel (Ni), cobalt (Co) and/or magnesium (Mg) and/or manganese (Mn), for instance iron (Fe), tin (Sn), antimony (Sb), titanium (Ti), copper (Cu), aluminum (Al), nickel (Ni), cobalt (Co) and/or magnesium (Mg). Such alloy metals have shown to be particularly advantageous for the creation of silicon alloys, in particular as anode material for lithium cells.

The at least one alloy metal compound may be soluble, in particular, in the at least one solvent. It is therefore possible in method step a) to use a solution of at least one solvent, the at least one silicon compound and the at least one alloy metal compound, in particular. Because of the heating under the reducing atmosphere in method step c), the at least one alloy metal compound is also able to be converted into metallic or elemental alloy metal, and in particular, be reduced to metallic or elemental alloy metal.

The removal of the at least one solvent in method step b) may be achieved by filtration and/or centrifugation and/or by drying in a vacuum and/or at a temperature of ≥30° C., such as ≥60° C., for example. During the filtration and/or centrifugation, the residue may be washed, possibly one time or multiple times, e.g., using at least one solvent, in particular an organic solvent, such as hexane and/or heptane. The drying may take place particularly in the high vacuum and/or at a temperature above the boiling point of the at least one solvent.

Within the scope of another specific embodiment, the method furthermore includes the method step d), in particular subsequent to method step c): coating of the silicon particles or the silicon shell, particularly the outer surface of the silicon shell, with carbon and/or silicon and/or a silicon alloy, such as an alloy of silicon and at least one alloy metal which is selected from the group made up of iron (Fe), tin (Sn), antimony (Sb), titanium (Ti), copper (Cu), aluminum (Al), nickel (Ni), cobalt (Co) and/or magnesium (Mg) and/or manganese (Mn) and/or silicon oxide. In this way, small tears and/or holes that may occur by the emergence of the gaseous components of the microorganisms, may advantageously be sealed. The penetration of electrolyte into the cavity enclosed by the silicon shell, and thus an SEI formation on the inner surface of the silicon shell, is advantageously able to be avoided in this way. Furthermore, on account of the coating, the silicon shell with the electro-chemically active silicon or the electro-chemically active silicon alloy can thereby advantageously be protected from an SEI formation. For instance, the electro-chemically active material of the silicon shell may change its volume within the coating, an SEI formation on the material of the silicon shell during the cyclization being prevented by the coating. In this way, a greater capacitance is able to be achieved as a whole. An SEI layer is advantageously able to form only on the coating, in particular on the outer surface of the coating.

In method step d), the silicon shell may be coated, for instance essentially completely, with carbon and/or silicon and/or a silicon alloy and/or silicon oxide.

In method step d), both one layer and also two or more layers may be applied.

Within the scope of one development, the silicon particles or the silicon shell, in particular the outer surface of the silicon shell, are coated with carbon in method step d). Because of the carbon coating, it is advantageously possible to seal small tears and/or holes and to increase the electrical conductivity of the silicon particles in the process. A loss in capacitance due to the creation of SEI is thereby advantageously able to be avoided and the electrical contacting of the silicon particles can be improved.

Within the scope of another development, the silicon particles or the silicon shell, in particular the outer surface of the silicon shell, are/is first coated with silicon and/or a silicon alloy and/or silicon oxide in method step d), whereupon the silicon and/or silicon alloy coating, in particular the outer surface of the silicon and/or silicon alloy coating, is coated with carbon. Because of the silicon and/or silicon-alloy coating, small tears and/or holes are advantageously able to be sealed and the capacitance of the silicon particles be increased. In an advantageous manner, the electrical conductivity of the silicon particles can be increased because of the outer carbon coating. This advantageously makes it possible to avoid a loss in capacitance due to an SEI formation, to improve the electrical contacting of the silicon particles, and to increase the capacitance of the silicon particles.

With regard to further technical features and advantages of the method of the present invention, explicit reference is hereby made to the explanations in connection with the silicon particles according to the present invention, the anode material according to the present invention, and the lithium cell according to the present invention, and also to the figures and the description of the figures.

Another subject matter of the present invention are silicon particles, in particular for an anode material of a lithium cell, such as a lithium-ion cell.

The silicon particles may be obtained by a method according to the present invention, in particular.

The silicon particles in particular may (each) have a silicon shell, which encloses a cavity in the shape of a microorganism, especially a cavity in the shape of a bacterium. The silicon shell may be produced from elemental silicon or a silicon alloy, in particular, such as an alloy of silicon and at least one alloy metal that is selected from the group made up of iron (Fe), tin (Sn), antimony (Sb), titanium (Ti), copper (Cu), aluminum (Al), nickel (Ni), cobalt (Co) and/or magnesium (Mg) and/or manganese (Mn), for instance iron (Fe), tin (Sn), antimony (Sb), titanium (Ti), copper (Cu), aluminum (Al), nickel (Ni), cobalt (Co) and/or magnesium (Mg).

The cavity may be bacteria-shaped, in particular. For instance, the cavity may be aspherical, or rod-shaped or curved in a rod-shape or comma-shaped or club-shaped or helical or filamentous or spiral-shaped, and screw-shaped, in particular.

The characteristic morphology of a structure or cavity shape derived from microorganisms, especially bacteria, may be identified by the cross-section and/or by scanning electron microscopy (SEM), for example.

For instance, the material of the silicon shell may be (essentially) free from silicon oxide and/or (essentially) free from silicon carbide and/or (essentially) free from carbon.

As the case may be, the silicon shell may be made of elemental silicon or a silicon alloy, such as an alloy of silicon and at least one alloy metal that is selected from the group made up of iron (Fe), tin (Sn), antimony (Sb), titanium (Ti), copper (Cu), aluminum (Al), nickel (Ni), cobalt (Co) and/or magnesium (Mg) and/or manganese (Mn).

Within the scope of one specific embodiment, the silicon shell, in particular the outer surface of the silicon shell, is coated with a carbon coating and/or a silicon coating and/or a silicon-alloy coating.

The silicon shell, in particular the outer surface of the silicon shell, may be coated essentially completely by the carbon coating and/or the silicon coating and/or the silicon-alloy coating, for instance.

For example, the outer surface of the silicon shell may be provided both with one and also two or more coatings.

Within the scope of one specific embodiment, the outer surface of the silicon shell is provided with a carbon coating.

Within the scope of another development, the outer surface of the silicon shell is provided with a silicon and/or silicon-alloy coating, and a carbon coating is in turn applied on the silicon and/or silicon-alloy coating.

The inner surface of the silicon shell in particular may be (essentially) free from carbon.

With regard to further technical features and advantages of the silicon particles according to the present invention, explicit reference is hereby made to the explanations in connection with the method according to the present invention, the anode material according to the present invention and the lithium cell according to the present invention, and to the figures and the description of the figures.

A further subject matter of the present invention is an anode material for a lithium cell, e.g., a lithium-ion cell, which includes silicon particles produced according to the present invention and/or silicon particles according to the present invention.

With regard to further technical features and advantages of the anode material according to the present invention, explicit reference is hereby made to the explanations in connection with the method of the present invention, the silicon particles according to the present invention, and the lithium-ion cell according to the present invention, and also to the figures and the description of the figures.

Furthermore, the present invention relates to a lithium cell, such as a lithium-ion cell, which includes silicon particles produced according to the present invention and/or silicon particles according to the present invention, and/or an anode material according to the present invention.

The cell, for example, is able to be used in an automotive application and/or a maritime application and/or a consumer application.

For instance, the cell may be part of a lithium battery, such as for a vehicle or a boat. The cell, for example, may be part of a traction battery of a vehicle or a ship, for example. A further subject matter may therefore also be a lithium battery of this type which includes a cell according to the present invention.

With regard to further technical features and advantages of the lithium cell according to the present invention, explicit reference is hereby made to the explanations in connection with the method of the present invention, the silicon particles according to the present invention, and the anode material according to the present invention, and to the figures and the description of the figures.

DETAILED DESCRIPTION

Figure 1:
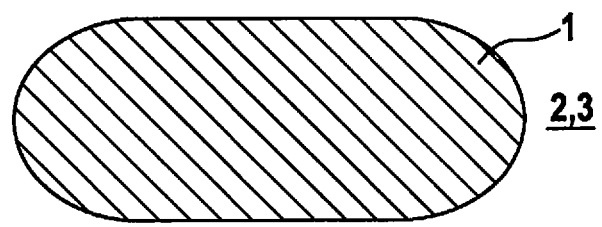
FIG. 1 a scheme for illustrating a specific embodiment of the method of the present invention for producing silicon particles and a specific embodiment of silicon particles according to the present invention.
Figure 1:
Figure 1:
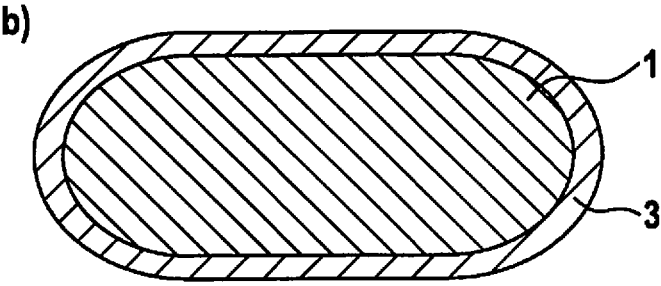
Figure 1:
Figure 1:
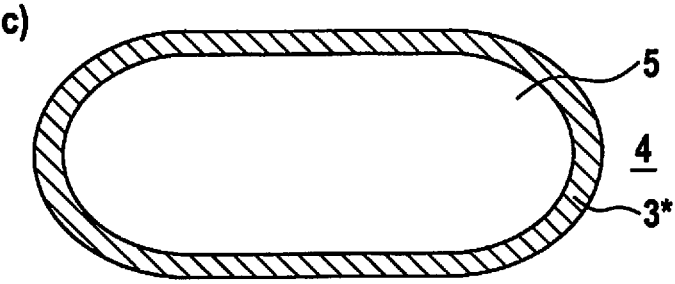

FIG. 1 shows that within the scope of the illustrated specific embodiment, microorganisms 1 are first dispersed in a method step a) in a solvent 2 that contains a silicon compound 3. In a method step b), solvent 2 is then removed, and a silicon compound 3 deposits on the surface of microorganisms 1 in the process and creates a coating on microorganisms 2. In a method step c), residue 1,3 remaining after the solvent has been removed, in particular in the form of microorganisms 1 coated with silicon compound 3, is then heated under a reducing atmosphere 4. Heating under reducing atmosphere 4, for one, converts and in particular, reduces, silicon compound 3 into or to metallic or elemental silicon 3*. For another, the heating under reducing atmosphere 4 removes microorganisms 1, especially carbon and/or phosphorus and/or nitrogen and/or oxygen and/or hydrogen and/or sulphur of the microorganisms. Instead of microorganisms 1, a cavity 5 then remains, which is enclosed by a silicon shell 3* that is created by the conversion or reduction of the at least one silicon compound 3.

Microorganisms 1, in particular, are bacteria, such as rod bacteria, e.g., bacilli. Solvent 2, for example, may be an organic solvent or solvent mixture, e.g., hexane and/or heptane, in which 2 a substituted or unsubstituted silane is dissolved as silicon compound 3. Silanes 3 may advantageously be converted into metallic or elemental silicon 3* through heating, for instance to a temperature in a range from >400° C. to <1410° C., under a hydrogen-containing atmosphere. Reducing atmosphere 4 may therefore contain hydrogen, in particular. Reducing atmosphere 4 in method step c) in particular may include hydrogen and at least one protective gas such as ≥1 vol.-% to ≤10 vol.-% hydrogen and ≥90 vol.-% to ≤99 vol.-% argon and/or nitrogen.

In addition to the silicon compound, solvent 2 in method step a) may include an alloy-metal compound, e.g., of iron (Fe), tin (Sn), antimony (Sb), titanium (Ti), copper (Cu), aluminum (Al), nickel (Ni), cobalt (Co) and/or magnesium (Mg). It may likewise be converted into the alloy metal in metallic form, and in particular reduced, in method step c).

Silicon shell 3* created in method step c) may thus be formed both from (pure) metallic or elemental silicon 3* and from a silicon alloy, in particular including one or a plurality of the alloy metal(s).

Figure 2:
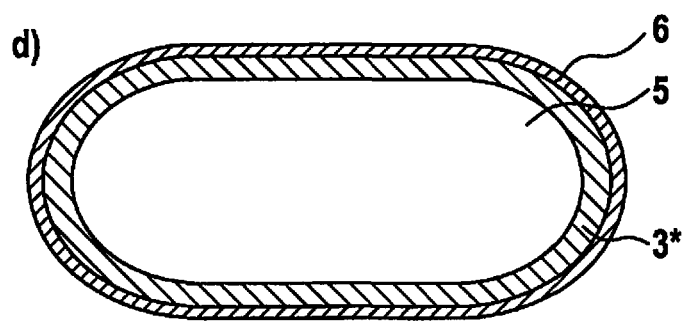
FIG. 2 a representation for illustrating a specific embodiment of the method according to the present invention and a specific embodiment of silicon particles according to the present invention.
Figure 3:
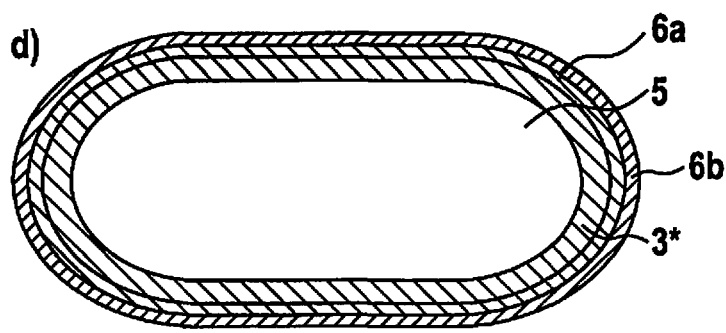
FIG. 3 a representation for illustrating a further specific embodiment of the method of the present invention and a further specific embodiment of silicon particles according to the present invention.

FIGS. 2 and 3 illustrate that within the scope of one specific embodiment of the method, the method may furthermore include method step d), in which silicon shell 3*, in particular the outer surface of silicon shell 3*, is coated with carbon 6;6b and/or silicon 6a and/or a silicon alloy 6a and/or silicon oxide, especially with carbon 6;6b and/or silicon 6a and/or a silicon alloy 6a. In method step d), silicon shell 3* may be coated with a carbon coating 6;6b and/or a silicon coating 6a and/or a silicon alloy coating 6a, such as essentially completely.

FIG. 2 illustrates that only one layer 6 is applied on silicon shell 3* in method step d). For instance, silicon shell 3*, especially the outer surface of silicon shell 3*, may be coated with carbon. Because of the carbon coating, small tears and/or holes are advantageously able to be sealed and the electrical conductivity of the silicon particles is able to be increased.

FIG. 3 illustrates the possibility of also applying two or more layers 6a,6b in method step d). For example, in method step d), silicon shell 3*, especially the outer surface of silicon shell 3*, may first be coated with silicon 6a and/or a silicon alloy 6a, whereupon the silicon and/or silicon-alloy coating 6a, in particular the outer surface of silicon and/or silicon-alloy coating 6a, is coated with carbon 6b. Because of silicon and/or silicon-alloy coating 6a, it is advantageously possible to seal small tears and/or holes and to increase the capacitance of the silicon particles. In an advantageous manner, outer carbon coating 6b makes it possible to increase the electrical conductivity of the silicon particles.

On account of the fact that the temperature is selected below 1400° C. in method step c), it can advantageously be ensured that the material of silicon shell 3* is (essentially) free from silicon carbide.

Because of a temperature of ≤1000° C. in method step c), it can advantageously be ensured that the inner surface of silicon shell 3* and, for example, also the material of silicon shell 3*, is (essentially) free from carbon.

And by a temperature of >1000° C., possibly in the form of a thermal after-treatment, in method step c), it is advantageously possible to ensure that the material of silicon shell 3* is (essentially) free from oxygen.

Figure 4:
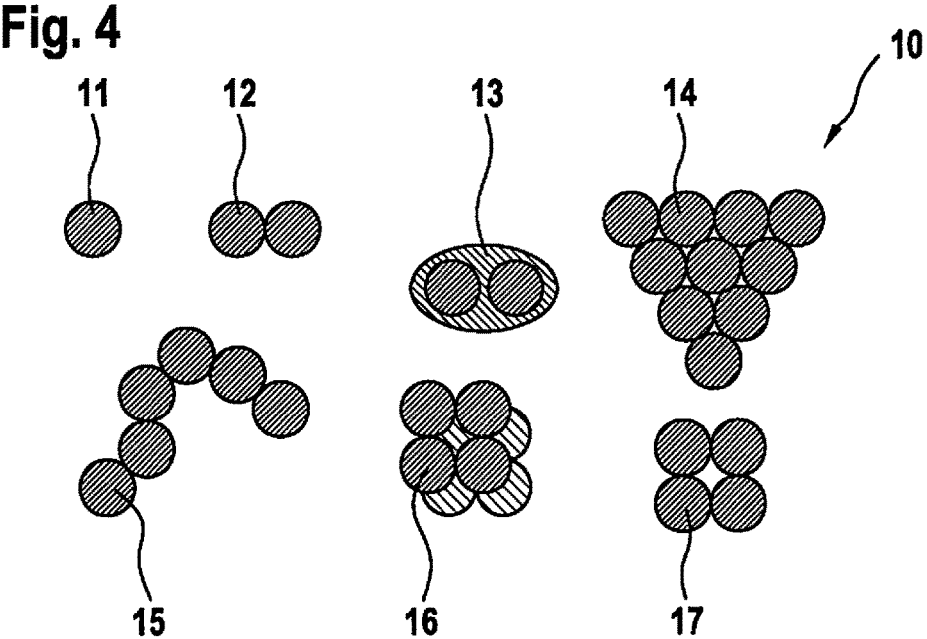
FIG. 4 schematic representations of cocci.

A few examples of cocci 10 are shown in FIG. 4. FIG. 4 illustrates that the single cocci 11 or monococci 11, diplococci 12, encapsulated diplococci 13, e.g., *pneumococcus, staphylococci* 14, *streptococci* 15, sarcines 16 and tetrads 17 may be counted among the group of cocci 10.

Figure 5:
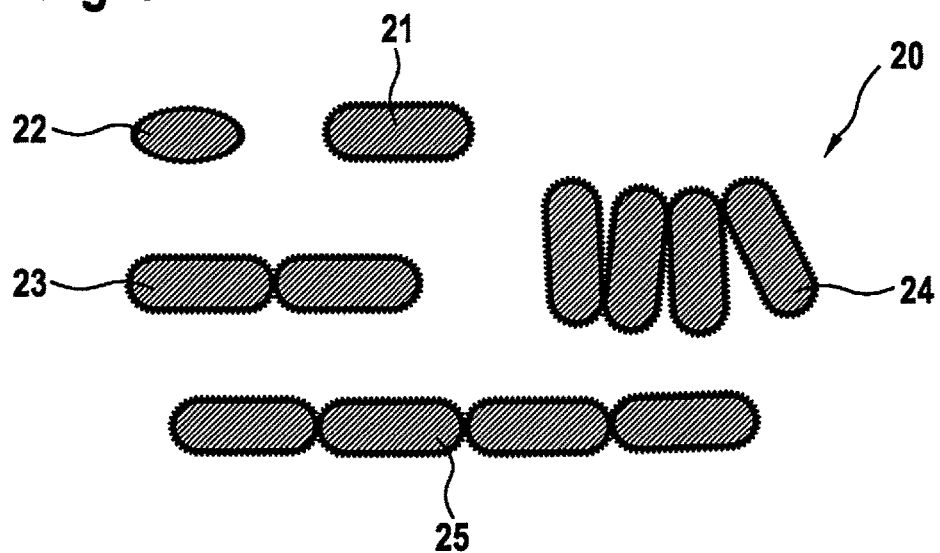
FIG. 5 schematic representations of bacilli.

FIG. 5 shows a few examples of bacilli 20. FIG. 5 illustrates that *bacillus* 21, coccobacillus 22, diplobacillus 23, palisades 24 and *streptobacillus* 25 may be counted among the group of bacilli 20.

Figure 6:
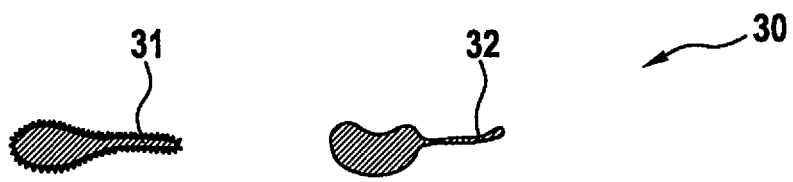
FIG. 6 schematic representations of budding bacteria appendages.

FIG. 6 shows examples of budding bacteria appendages 30. FIG. 6 illustrates that hyphae 31 and stalks 32 may be counted as belonging to budding bacteria appendages 30.

Figure 7:
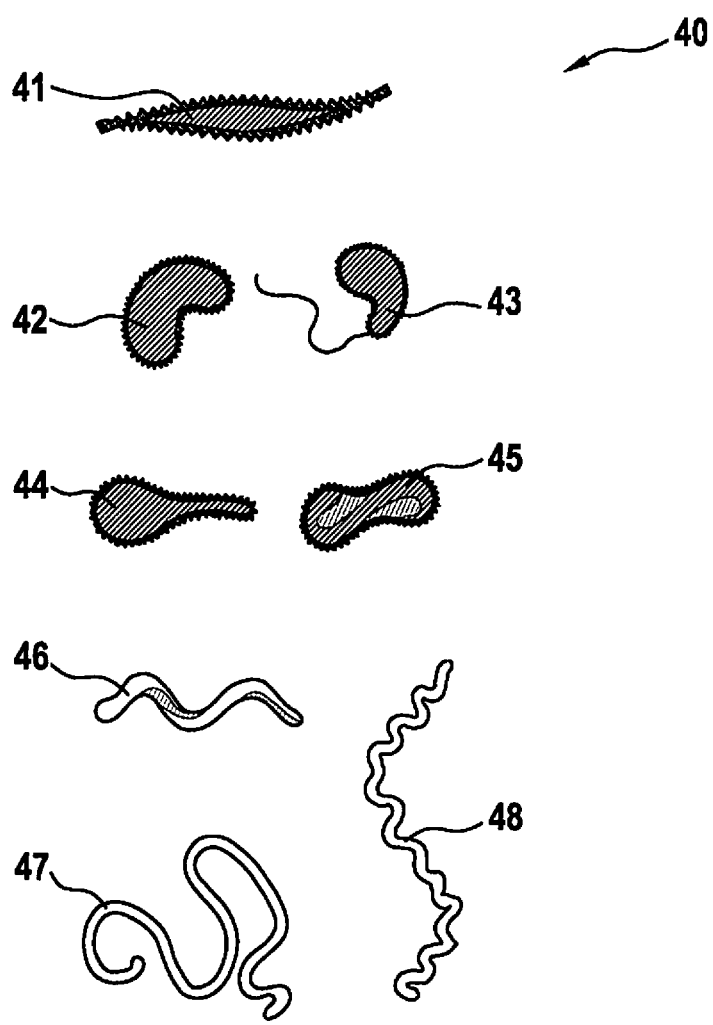
FIG. 7 schematic representations of other bacteria forms.

FIG. 7 shows a few example of other bacteria forms 40. FIG. 7 illustrates that enlarged rods 41, such as fusobacterium, vibrio 42, comma-shaped bacteria 43, e.g., bdellovibrio, club-shaped bacteria 44, e.g., *corynebacteriaceae*, helical bacteria 45, e.g., *helicobacter pylori*, corkscrew-shaped bacteria 46, e.g., *borrelia burgdorferi*, filamentous bacteria 47 and *spirochaeta* 48 are counted among other bacteria forms 40.

What is claimed is:

1. A method for producing silicon particles for an anode material of a lithium cell, the method comprising:
   a) dispersing microorganisms in at least one solvent that includes at least one silicon compound;
   b) removing the at least one solvent, a residue remaining in the process; and
   c) heating the residue under a reducing atmosphere to a temperature in a range from >400° C. to <1410° C.;
   wherein the at least one silicon compound is one of a substituted silane and an unsubstituted silane, and
   wherein the at least one silicon compound includes:
      a silane of the general chemical forumula: $SiCl_xH_{4-x}$, where 0≤x≤x 4, and
      an alkylsilane and/or arylsilane of the general chemical formula: $SiR^1R^2R^3R^4$, $R^1$, $R^2$, $R^3$, and $R^4$ independently of each other substituting for hydrogen or chlorine or an alkyl group or an aryl group in each case, and at least one of the substituents $R^1$, $R^2$, $R^3$, and $R^4$ substituting for an alkyl group or an aryl group.

2. The method as recited in claim 1, wherein the reducing atmosphere in task c) includes an oxygen partial pressure of less than $1×10^{-24}$ bar.

3. The method as recited in claim 1, wherein the reducing atmosphere in task c) includes hydrogen and at least one protective gas.

4. The method as recited in claim 3, wherein the reducing atmosphere in task c) includes ≥1 vol.-% to ≤10 vol.-% of hydrogen and ≥90 vol.-% to ≤99 vol.-% of the at least one protective gas.

5. The method as recited in claim 1, wherein the residue is heated to a temperature in a range from >400° C. to ≤1000° C. in task c).

6. The method as recited in claim 5, wherein the residue is then heated to a temperature in a range from >1000° C. to ≤1200° C. in task c).

7. The method as recited in claim 1, wherein dried microorganisms are used in task a).

8. The method as recited in claim 1, wherein the microorganisms in task a) include bacteria.

9. The method as recited in claim 8, wherein the microorganisms in task a) include bacteria that are selected from the group of at least one of rod-shaped bacteria, coccobacteria, enlarged rod-shaped bacteria, bacteria having a curved rod shape, comma-shaped bacteria, club-shaped bacteria, helical bacteria, filamentous bacteria, screw-shaped bacteria, budding bacteria, and bacterial structures having a plurality of cells.

10. The method as recited in claim 1, wherein the at least one solvent includes an organic solvent.

11. The method as recited in claim 1, wherein the dispersing in task a) additionally includes at least one alloy metal compound, the at least one alloy metal compound including at least one alloy metal which is selected from the group made up of at least one of iron, tin, antimony, titanium, copper, aluminum, nickel, cobalt and magnesium.

12. The method as recited in claim 1, wherein the silicon particles are formed in task c), each having a respective silicon shell enclosing a cavity, the method further comprising:
   d) coating the silicon shell with at least one of carbon, silicon, a silicon alloy, and silicon oxide.

* * * * *